United States Patent

Raidl

[15] 3,685,686

[45] Aug. 22, 1972

[54] PRECISE SAFETY DEVICE

[72] Inventor: John H. Raidl, 6625 Milhaven Drive, Mission, Kans. 66222

[22] Filed: Dec. 29, 1969

[21] Appl. No.: 888,394

[52] U.S. Cl. ..................................220/89 A, 220/47
[51] Int. Cl. ............................................B65d 47/36
[58] Field of Search........................220/89 A, 47, 27

[56] References Cited

UNITED STATES PATENTS

| 3,526,336 | 9/1970 | Wood | 220/89 A |
| 3,294,277 | 12/1966 | Wood | 220/89 A |
| 3,464,585 | 9/1969 | Summers | 220/89 A |

*Primary Examiner*—Raphael H. Schwartz
*Attorney*—Koenig, Senniger, Powers and Leavitt

[57] ABSTRACT

A precise, reverse-acting, frangible disc pressure device is provided with a factory assembled, frangible member sub-assembly having a pre-bulged frangible disc with its annular flange secured between first and second seating rings. The frangible disc sub-assembly and a co-acting knife blade sub-assembly are mounted in annular grooves on the mating faces of flanges. A particular feature is the supporting of the downstream disc seating ring against an annular seat on the knife blade sub-assembly so that the device will not seal against pressure in the event the knife blade sub-assembly is inadvertently omitted.

3 Claims, 6 Drawing Figures

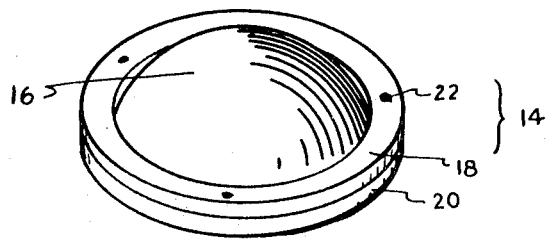
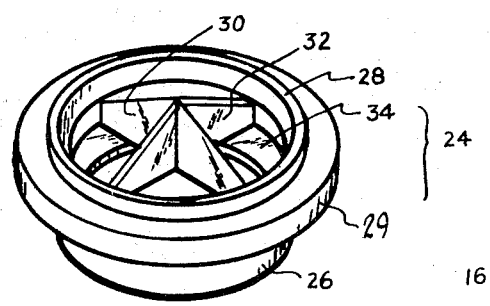
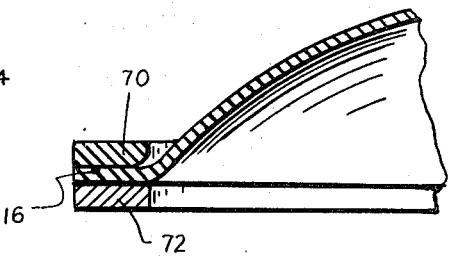
FIGURE 1
FIGURE 3
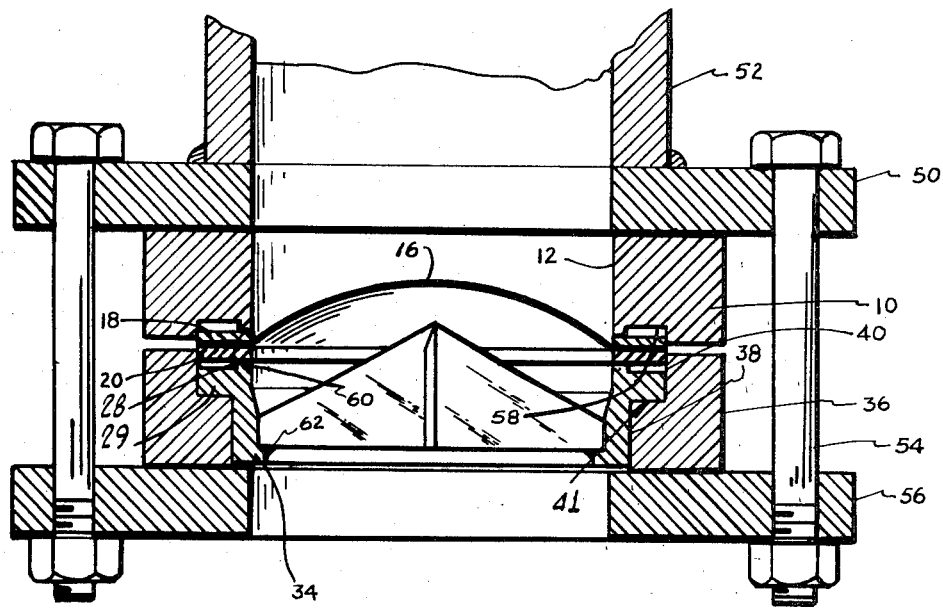
FIGURE 2
INVENTOR.
JOHN H. RAIDL PATENTED AUG 22 1972 3,685,686
SHEET 2 OF 2
FIGURE 4
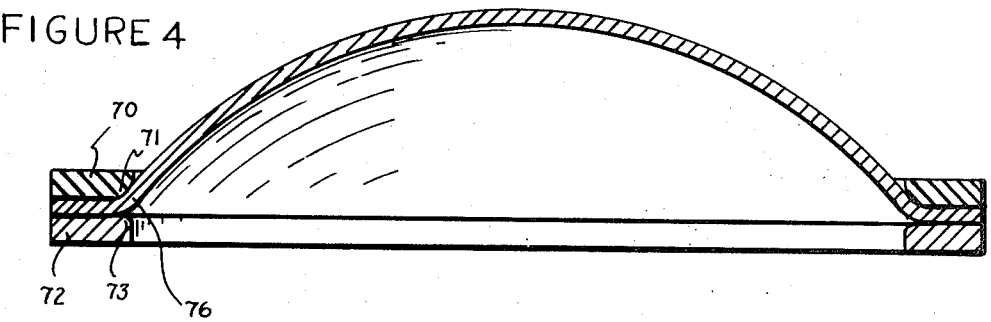
FIGURE 5
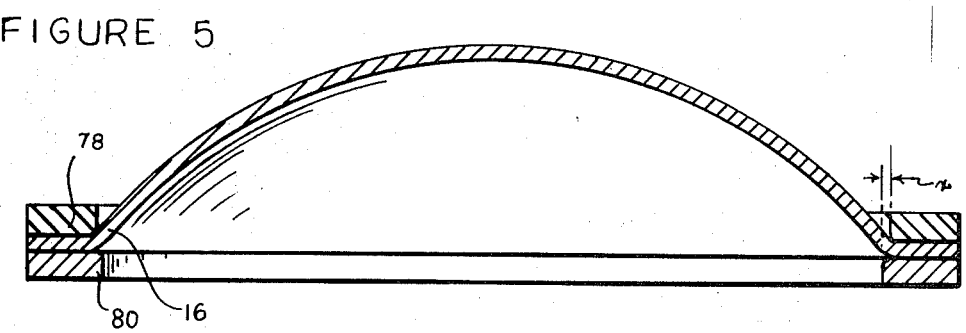
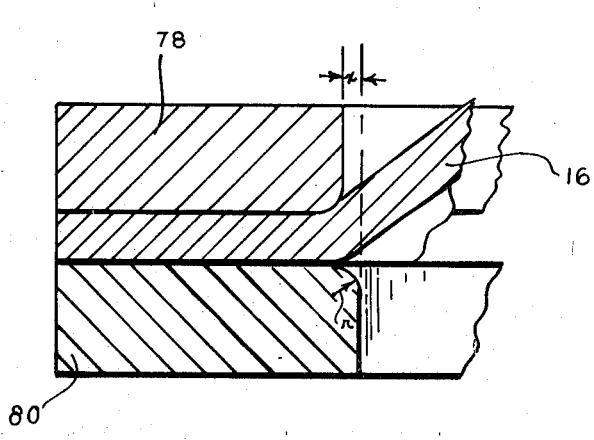
FIGURE 6
INVENTOR.
JOHN H. RAIDL
BY
ATTORNEY

PRECISE SAFETY DEVICE

DISCLOSURE OF THE INVENTION

This invention relates to a reverse-acting, frangible member relief device and, in particular, to means that insure the precision of operation of field assemblies of such devices.

The reverse-acting, frangible member relief devices typically comprise inlet and outlet flanges with a passageway therethrough, a frangible disc member having a central dome convexly oriented towards the inlet flange with an integral annular flange seated between said flanges to seal the passageway through said flanges, and a knife blade supported by the outlet flange in axial proximity to the concave side of the disc member to impale said disc member when it responds to excessive upstream pressure and snaps over center.

The device fails when the upstream pressure exceeds the design relief pressure and exerts an axial force on the disc member which is sufficient to cause elastic instability in the transition between the flat annular portion and the central dome. The disc responds by snapping over center, i.e., by reversing its upstream face from a convex to a concave configuration. A knife blade mounted downstream of the disc impales the latter when the disc snaps over center.

An advantage of the reverse acting relief devices is their precision of operation. Because the elastic instability of the disc is reproducible with a high degree of precision, the devices can be safely operated at up to 90 percent of their design relief pressure, thereby providing considerable savings in pressure equipment construction. Unfortunately, the advantage of safe operation at pressures within 90 percent of the relief pressure is generally not achieved because of inaccuracies in the assembly of the device, particularly in field installations.

It has now been found that the major cause of the failure to achieve the aforementioned advantage of precise operation in a reverse acting device is the inaccuracy of orientation of the disc member in the assembly, particularly in the failure to maintain precise engagement between the supporting shoulder of the downstream flange and the transition of the disc, i.e., the circular junction between the central dome and the integral annular flange of the disc. Even minor deviations in the orientation of the disc to the supporting shoulder of the outlet flange can appreciably change the snap over pressure of the disc.

The relief device of this invention insures precision of operation and attains the advantage of safe operating pressure up to ninety percent of the relief pressure by use of a disc sub-assembly having the annular flange of the disc secured between seat rings. The sub-assembly is prefabricated under precise factory conditions and, in a preferred embodiment, the radius of curvature of the inner annular shoulder of the seat ring on the concave side of the disc is less than that of the seat ring on the convex side of the disc to facilitate the precision of operation. An additional feature of the invention is the seating of the disc sub-assembly against a knife blade sub-assembly so that the device can not be sealed unless both sub-assemblies are installed.

The invention will now be described by reference to the FIGURES, of which:

FIG. 1 is an exploded view of the assembly of the knife blade sub-assembly and the disc sub-assembly;

FIG. 2 is a cross sectional view of the assembled device;

FIG. 3 is a view of a portion of an alternative disc sub-assembly; and

FIGS. 4–6 illustrate other alternative sub-assemblies.

Referring now to FIG. 2, the device is shown with an inlet flange 10 having a central opening or bore 12. Beneath this flange is shown the disc sub-assembly. This sub-assembly is also shown in FIG. 1 as comprising a frangible disc 16 having a central dome and an annular flange that is secured between flat-faced seating faces of mounting rings 18 and 20.

The frangible disc is formed from thin metallic stock having a thickness from about 0.5 to about 50 mils, as required for the relief pressure and diameter of the disc, and can be of any suitable corrosion resistant material, e.g., stainless steel, titanium, aluminum, etc. The disc is formed with a central dome portion having an arcuate cross section, preferably a hemispherical shape. The disc has an integral annular flange surrounding the dome and the mounting rings are secured to opposite sides of this flange by suitable means, e.g., spot welds 22.

The knife sub-assembly depicted at 24 comprises a sleeve body member 26 which bears, on its upstream face, rim 28 and a peripheral flange 29. This rim constitutes an end portion of the body member and has an end seating face engageable by ring 20 located in a plane perpendicular to the axis of the body member. At least one, and preferably two knife blades 30 and 32 are secured to the inside wall of sleeve body 26 with the apex of the blades directed towards the dome of disc 16. The plane of the stated end seating face is proximate the apex of the blades. In a preferred construction, an annular ledge 34 is provided on the inside base of the sleeve body 26 to support the blades 30 and 32.

Referring now to FIG. 2, the downstream flange 36 has a central opening or bore 38 and a counterbore 40 having a shoulder 41 constituting a seating face. Bore 38 is of sufficient diameter to receive the lower end of sleeve 26. The annular flange 29 with its rim 28 of the knife blade sub-assembly fits within counterbore 40 and serves as a stop against downstream movement of the knife blade sub-assembly.

The assembled device is shown in cross section in the FIG. 2, retained in assembly by a conventional bolted flange 50 and an outlet flange 56 which are secured by bolts 54. The inlet flange 50 is shown welded to a conduit 52 that is exposed to the system pressure. The inlet mounting flange 10 is shown with an annular groove 58 on its downstream face which has a slightly greater diameter than the mounting ring 18 to center the disc sub-assembly on the flange. The inner diameter of groove 58 is greater than the diameter of bore 12 to provide a seat rim 60 which engages the mounting ring 18. The arcuate cross section of the central dome of disc 16 is shown in its normal position, convexly oriented to the system pressure.

The knife blade sub-assembly is retained by mounting flange 36 with the circular rim 28 thereof seated against the downstream mounting ring 20. The knife blades rest against ledge 34 and are welded thereto at 62. The apex of the knife blade sub-assembly is shown in axial proximity to the disc 16 so that when the disc snaps over center and reverses its position it will be impaled by the blades.

As illustrated in FIG. 2, the two mounting rings 18 and 20 are identical and the inner shoulders of these rings support the transition of the disc. The disc can be bulged before or after assembly between rings 18 and 20. Preferably, the rings are secured to a flat disc and the resulting assembly is then placed between fluid tight flanges and sufficient pneumatic pressure is applied to the disc to cause the disc to bulge into the illustrated hemispherical shape. The forming pressure applied to the disc can be varied considerably, depending on the thickness of the disc and the desired snap over pressure. To illustrate the wide flexibility of snap over pressures that can be achieved with discs having from 1.5 to about 10 mils thicknesses, forming pressures from 50 to about 600 psig. will provide reverse acting discs with snap over pressures from about 2.5 to 225 psi. The forming pressure actually used is within the range of forming pressures where there is a substantially linear, direct relationship between the forming pressure and the snap over pressure of the disc when it is used in the reverse position, i.e., with its convex side towards the system pressure. When the disc is prebulged before the rings are mounted, it is then removed from the forming flanges and rings 18 and 20 are secured on opposite sides of the peripheral flange of the disc.

With the construction shown in FIG. 2, both the upper and lower rings are required to be mounted precisely in the sub-assembly with regard to each other and to the transition of the disc so that the downstream ring 20 provides a shoulder or ledge support for the transition of the disc. The necessity for such exact prealignment of rings 18 and 20 is not obviated by assembly of the rings to a flat disc before bulging the disc since the transition will be formed against the inner shoulder of ring 18 and, if this shoulder is slightly off center with regard to the opposite shoulder of ring 20, the transition will not be entirely supported by ring 20 in subsequent use of the disc sub-assembly. Thus it is the relative alignment of the transition portion and support ring 20 which is important. The snap-over pressure of the diaphragm is, accordingly, substantially independent of any eccentric misalignment of the transition portion with respect to the axis of the mounting flanges 50 and 56.

A more preferred construction is shown in FIG. 3. In this figure as well as in FIGS. 4–6, the thickness of the disc is enlarged relative to the ring thicknesses so that the curvature about the transition can be more clearly illustrated. The embodiment of FIG. 3 still uses mounting rings having equal diameters of their inside bores, however, the upstream side of ring 70 is formed with a rounded shoulder having a radius of curvature which is considerably greater than the corresponding radius of curvature of the downstream ring 72. As illustrated, the sub-assembly of FIG. 3 is typical of an assembly of rings to a pre-bulged disc. The use of rings 70 and 72 in the construction simplifies manufacture of the disc sub-assembly since only ring 72 need be precisely oriented to disc 16 so that the surface of ring 72 engages the downstream side of the disc flange uniformly about the transition. Since the shoulder of ring 70 has a greater radius of curvature, the face of ring 70 seats against the upstream side of the disc flange along a circular arc that is positioned radially outwardly from the engagement between disc 16 and ring 72. In the event that some misalignment of the rings to the disc occurs, the engagement between ring 70 and the flange of the disc 16 does not extend to the inside of the engagement between the flange and the shoulder of the downstream ring 72. In this manner, ring 70 is removed from exerting any substantial influence on the necessary snap over pressure of disc 16 and only the assembly of ring 72 and disc 16 is critical to the precise functioning of the disc.

FIG. 4 illustrates the disc sub-assembly with the mounting rings 70 and 72 described in FIG. 3 and with a disc 76 which has been formed after assembly of the rings to the disc. In this construction, disc 76 is formed against the rounded shoulder 71 of ring 70 and the transition junction assumes approximately the radius of curvature of shoulder 71. The base of the disc, i.e., its transition, is therefore slightly to the outside of the shoulder 73 of ring 72, thereby insuring that the shoulder 73 extends past the transition and serves as a shelf to support the transition of disc 76.

FIGS. 5 and 6 illustrate another embodiment that can be used to insure that the downstream ring will afford a support shelf for the transition of disc 16. In this construction, the rings 78 and 80 have rounded shoulders of approximately equal radii. This is preferred, however, it is not critical and, if desired, the radius of the shoulder of ring 78 can be greater than that of ring 80. Ring 80 is shown with a slightly lesser inner diameter than that of ring 78 so that it projects beneath the transition of the disc and serves as a ledge to support this transition.

FIG. 6 illustrates the relationship of the inner diameters of these rings in greater detail. The difference in the inner radii of the upper ring 78 and the lower ring 80 is shown as $x$. The radius of curvature of the inner shoulder of ring 80 is shown as $r$. A ledge will be provided beneath the transition of disc 16 so long as the spacing $x$ is at least about $0.5r$. To avoid excessive constriction of the inner diameter of ring 80, it is preferred that the value of $x$ be less than $r$ and a typical range can be from 0.5 to 0.9 times $r$.

The invention has been described with regard to the preferred mode of practice shown in the drawings. It is not intended that the scope of the invention be unduly limited thereby, but that it also include the obvious equivalents to those illustrated.

What is claimed is:

1. A frangible disc relief device comprising a pair of mounting flanges each having seating faces and a central opening and means for securing the seating faces of said flanges together with a knife blade sub-assembly and a frangible disc sub-assembly clamped between said seating faces of the flanges, said knife blade sub-assembly comprising an annular body member carrying at least one V-shaped knife blade extending thereacross, said body member having a flanged end portion supported on one of the said seating faces and clamped between said seating faces of the mounting flanges, said end portion having an end face located in a plane perpendicular to the axis of said body member and said mounting flanges and proximate the apex of the V-shaped knife blade, said frangible disc sub-assembly comprising a thin, metallic disc having a central dome portion and an integral flat annular flange sur-